(12) United States Patent
Roe et al.

(10) Patent No.: US 8,346,954 B2
(45) Date of Patent: Jan. 1, 2013

(54) NETWORKING ARCHITECTURE FOR EFFICIENT COMMUNICATION BETWEEN DIFFERENT TYPES OF HOME NETWORKS

(75) Inventors: Bryan Y. Roe, Camas, WA (US); Jonathan G. Ritchie, Hillsboro, OR (US); James W. Edwards, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 940 days.

(21) Appl. No.: 11/648,018

(22) Filed: Dec. 29, 2006

(65) Prior Publication Data

US 2008/0159307 A1 Jul. 3, 2008

(51) Int. Cl.
*G06F 15/16* (2006.01)
(52) U.S. Cl. .......................... 709/230; 370/230; 370/401
(58) Field of Classification Search .................. 709/230; 370/230, 401
See application file for complete search history.

(56) References Cited

U.S. PATENT DOCUMENTS

| | | | | |
|---|---|---|---|---|
| 7,346,025 | B2 * | 3/2008 | Bryson ......................... | 370/328 |
| 2003/0185185 | A1 * | 10/2003 | Chang et al. .................. | 370/338 |
| 2005/0198336 | A1 * | 9/2005 | Eytchison et al. ............ | 709/230 |
| 2005/0232283 | A1 * | 10/2005 | Moyer et al. .................. | 370/401 |
| 2006/0128364 | A1 * | 6/2006 | Costa-Requena et al. .. | 455/414.3 |
| 2006/0153072 | A1 * | 7/2006 | Bushmitch et al. ........... | 370/230 |
| 2006/0282863 | A1 * | 12/2006 | Bushmitch et al. ............. | 725/80 |

OTHER PUBLICATIONS

Universal Plug and Play—Wikipedia, The Free Encyclopedia, "Universal Plug and Play", http://en.wikipedia.org/wiki/Universal_Plug_and_Play, Oct. 18, 2006, pp. 1-7.
Universal Plug and Play Device Architecture, "UPnP Device Architecture", http://www.upnp.org/download/UPnPDA10_20000613.htm, Oct. 18, 2006, pp. 1-52.

* cited by examiner

*Primary Examiner* — Thomas Dailey
(74) *Attorney, Agent, or Firm* — Blakely, Sokoloff, Taylor & Zafman LLP (57) ABSTRACT

A method is described that involves performing the following between first and second appliance networks: receiving a packet from the first appliance network; removing header information for the first appliance network from the packet; and, sending the packet's payload into the second appliance network without having appended any header information for the second appliance network to the payload. Another method is described that involves performing the following with a network interface to a first appliance network: receiving a first command through an API for the first appliance network where the command identifies an appliance and an action to be taken by the appliance; translating the first command into a second command that identifies the appliance and the action to be taken by the appliance, where the second command is in a format for a second appliance network that is a different type of appliance network than the first appliance network; and, constructing a packet having header information formatted for the first appliance network and a payload containing the second command.

26 Claims, 9 Drawing Sheets

NETWORKING ARCHITECTURE FOR EFFICIENT COMMUNICATION BETWEEN DIFFERENT TYPES OF HOME NETWORKS

FIELD OF INVENTION

The field of invention relates generally to the computer sciences; and, more specifically, to a networking architecture for efficient communication between different types of home networks.

BACKGROUND

The commoditization of silicon chips has permitted the integration of "intelligence" (in the form of a processor or microcontroller executing program code) and "connectivity" (in the form of some kind of network interfacing capability) into many household or office appliances such as a remote controls, televisions, telephones, security systems, lights and/or lighting systems, music and/or video players, recorders, and/or receivers, thermostats, smoke detectors, garage door openers, meters, etc. Unfortunately, a number of different networks have come into existence for permitting such household devices to communicate (e.g., X10, ZigBee, Z-Wave, IEEE 802.11 based networks and Universal Plug-n-Play (UPnP)) leaving the home owner (or IS manager) with the problem of "bridging" between networks so that an appliance connected to one type of network can communicate with another appliance connected to another type of network.

Figure 1:
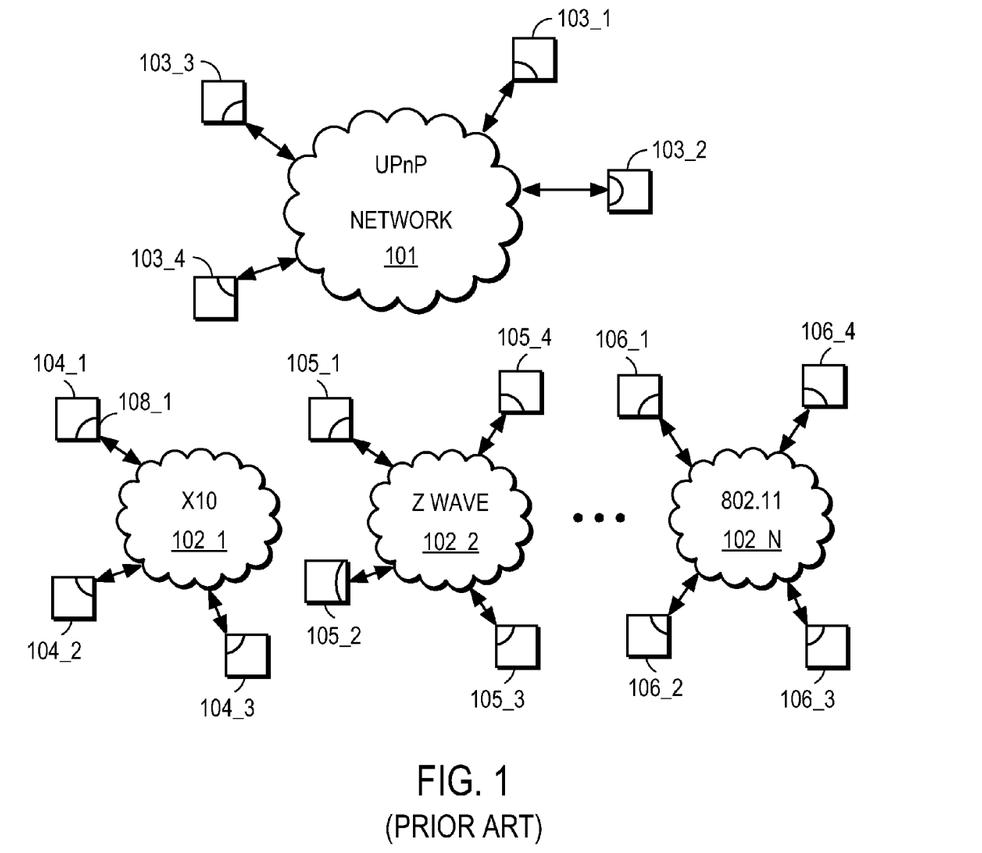
FIG. 1 (prior art) shows a plurality of appliance networks.

FIG. 1 shows a schematic depiction of the problem which may be viewed as the network environment within a home or office. Here, a number of different appliance networks 101, 102_1, 102_2, . . . 102_N are observed each with their own associated appliances. Specifically, UPnP network 101 communicatively couples appliances 103_1 through 103_4; X10 network 102_1 communicatively couples appliances 104_1 through 104_3, Z-Wave network 102_2 communicatively couples appliances 105_1 through 105_4; and 802.11 network 102_N communicatively couples appliances 106_1 through 106_4. Here, it should be understood that the term appliance is meant to include other electronic devices besides those listed above including (but not limited to) personal computers (including laptop/notebook computers), personal digital assistances (PDAs) and cell phones. An appliance network is a packet based network that communicatively couples appliances.

Figure 2:
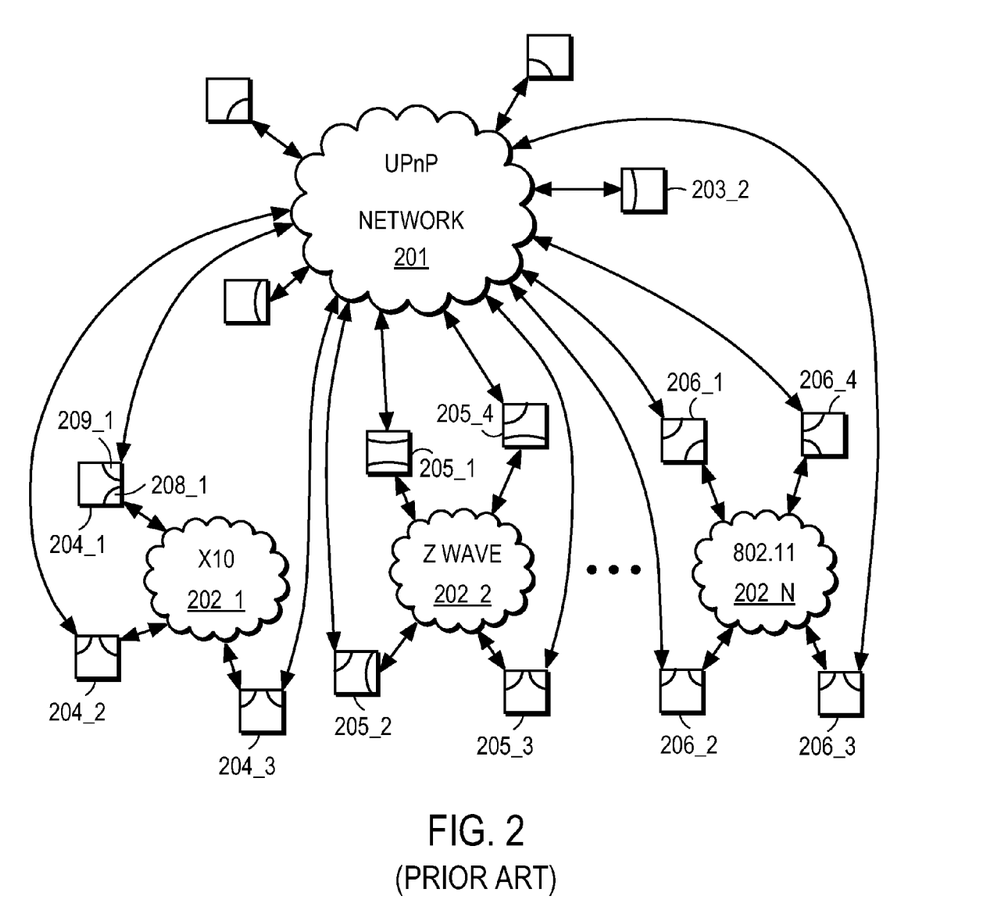
FIG. 2 (prior art) shows a first prior art approach for permitting communication between appliances connected to different appliance networks.
Figure 3:
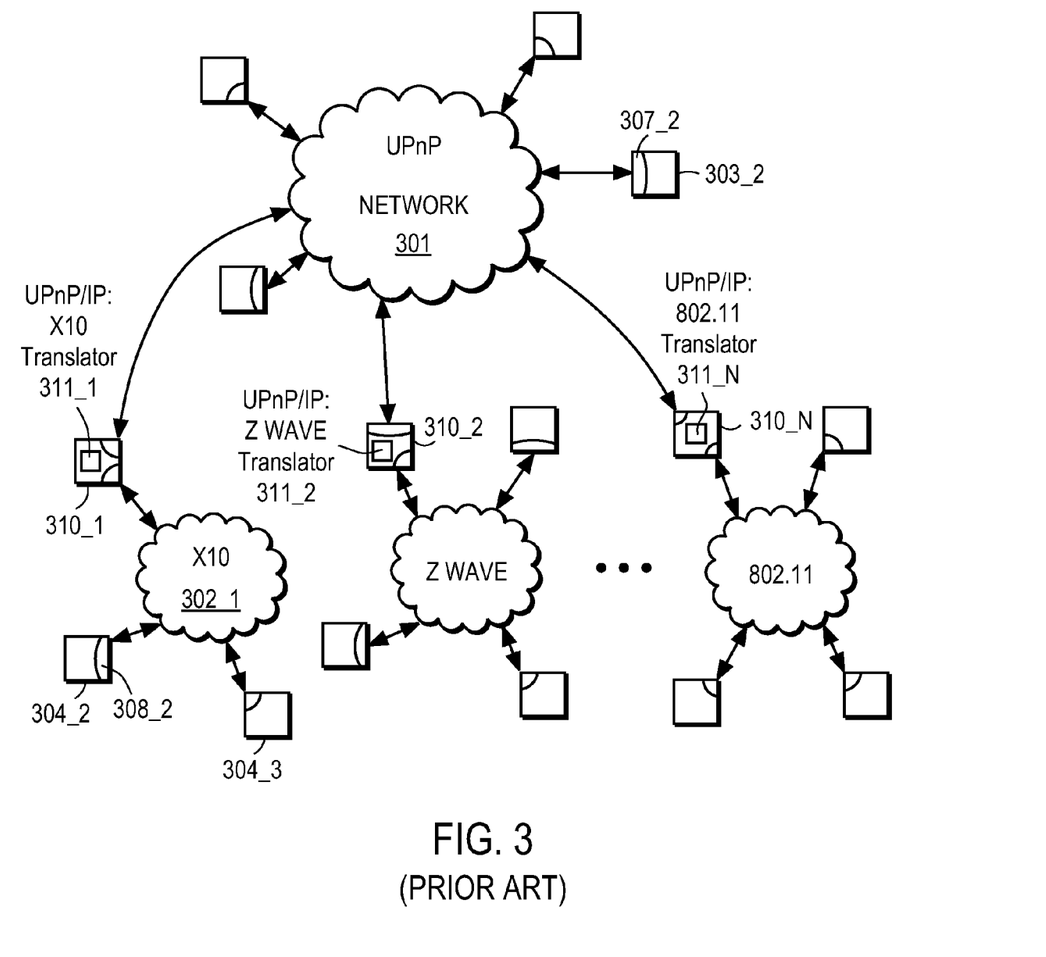
FIG. 3 (prior art) shows a second prior art approach for permitting communication between appliances connected to different appliance networks.

FIGS. 2 and 3 show some prior art approaches for bridging a UPnP network to a number of non UPnP networks. According to the approach of FIG. 2, the bridging is performed by essentially making every appliance UPnP compatible as well as compatible with its other associated non UPnP network. For instance, compare appliance 104_1 of FIG. 1 with appliance 204_1 of FIG. 2. Appliance 104_1 of FIG. 1 only has a single network interface 108_1 so that it can communicate through the X10 network 102_1. By contrast, referring to FIG. 2, appliance 204_1 now has two interfaces: a first network interface 208_1 for the X10 network 202_1 and a second network interface 209_1 for the UPnP network 201.

Embedding all of the appliances 204_1 through 204_3, 205_1 through 205_4, 206_1 through 206_4 with dual network capability as depicted in FIG. 2 allows each of these appliances to communicate both with its respective local network 202_2, 203_2 or 202_N and the UPnP network 201. A problem with this approach, however, is that is has the potential to raise the complexity and/or cost of these appliances (in terms of additional or more advanced hardware (e.g., additional physical interface components and/or memory and/or higher performance processing cores) and/or software (e.g., a pair of executable protocol stacks: one for each the networks).

FIG. 3 shows another prior art approach that embraces the use of gateways 310_1, 310_2, 310_N having respective translator software 311_1, 311_2, 311_N. Here, it is pertinent to realize that a network interface to an appliance network interface typically provides a software application programming interface (API) at least for sending commands to specific appliances. For example, if a personal computer (PC) on the X10 network 302_1 (e.g., appliance 304_2) desires to turn on a light that is also connected to the X10 network (e.g., appliance 304_3), software running on the PC 304_2 will issue a command through the API of the X10 network interface 308_2 that identifies the light and the action to be taken (i.e., turning on the light). The software and hardware running on the PC that correspond to the X10 network interface 308_2 then act to construct a packet in the X10 format containing the command. The packet is then sent from the PC 304_2 to the light 304_3 over the X10 network 302_1.

The act of turning on a light connected to the X10 network from a PC becomes more complex, however, if the PC that issues the command is located on another network such as the UPnP network 301 (e.g., PC 303_2_. Specifically, because the PC 303_2 is connected to the UPnP network 301, the PC 303_2 only has a network interface 307_2 with corresponding API for a UPnP network. As such, the PC 303_2 can only issue a command through its UPnP API and send a UPnP packet to gateway 310_1.

A UPnP:X10 translator 311_1 residing on the gateway 310_1 is responsible for comprehending the UPnP command contained in the payload of the packet and translating it into the same command but crafted in the X10 format. That is, the payload of the packet is changed from a command to turn on a specific light scripted in the UPnP format into a command to turn on the same light scripted in the X10 format. Routing and transport layer headers may also need to be changed/removed as well in order to construct a complete, new X10 packet containing the command originally issued by the PC 303_2 on the UPnP network 301. The gateway 310_1 then sends the X10 packet created by the translator 311_1 to the light 304_3 over the X10 network 302_1 and the command is executed.

FIGURES

The present invention is illustrated by way of example and not limitation in the figures of the accompanying drawings, in which like references indicate similar elements and in which.

DETAILED DESCRIPTION

Although the prior art approach of FIG. 3 avoids increasing the complexity/cost of the appliances in the manner that the approach of FIG. 2 does, the approach of FIG. 3 nevertheless still exhibits efficiency problems in the form of fairly complex/costly gateways 310_1 through 310_N. Here, the software that performs the translation functions 311_1, 311_2 through 311_N is somewhat complex in the sense that, ideally, they are each designed to comprehend any command contained by a received packet, and, rewrite that command into the proper format for the packet to be transmitted.

This typically involves an understanding of how specific appliances are identified in both the incoming and outgoing packet languages (and the ability to map the identification of a particular appliance articulated in the incoming packet format to the identification of the particular appliance articulated in the outgoing packet format) and an understanding of how specific appliance actions are specified in both the incoming and outgoing packet languages (and the ability to map the identification of a particular appliance articulated in the incoming packet format to the identification of the particular appliance articulated in the outgoing packet format). Because of the relative sophistication of the translator software, the processing power of the gateways 310_1 through 310_N should be fairly powerful.

Figure 4:
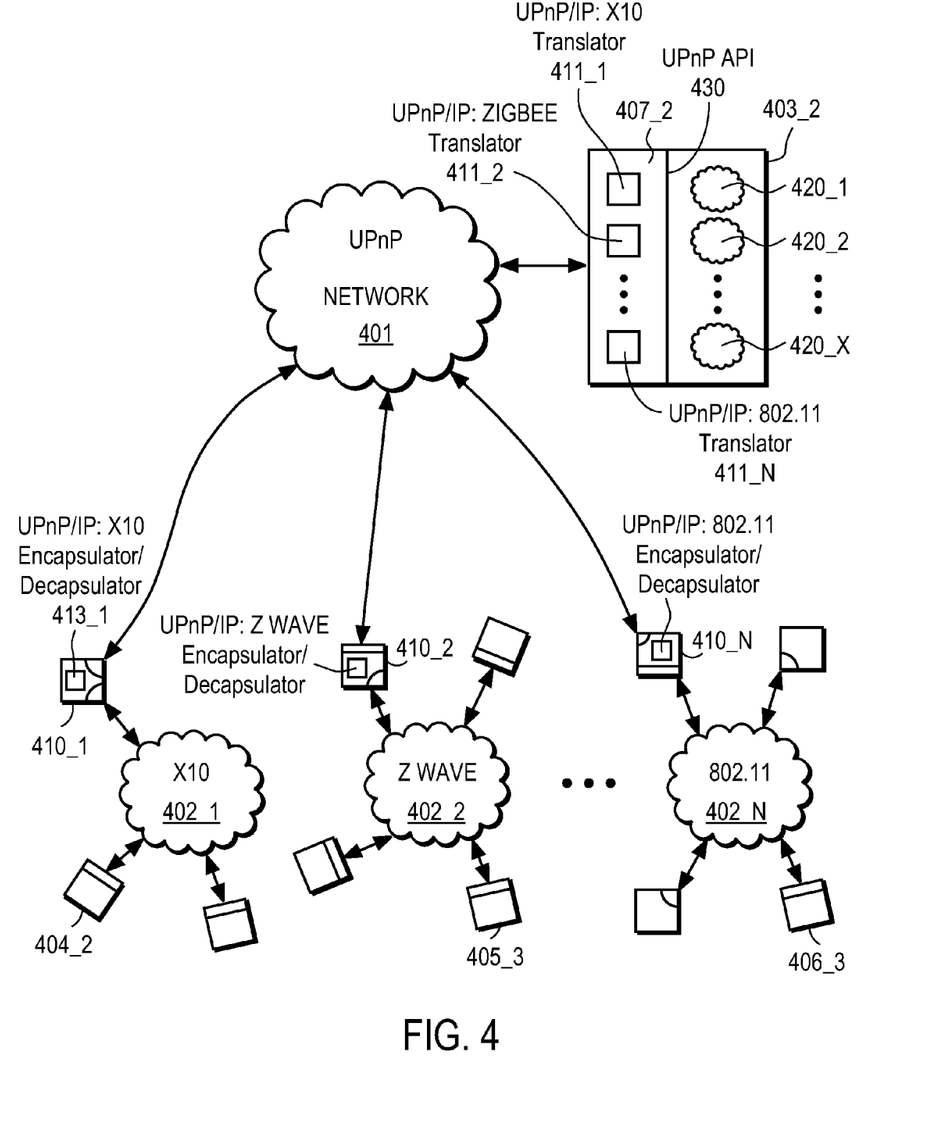
FIG. 4 shows an improved approach for permitting communication between appliances connected to different appliance networks.

The approach of FIG. 4 is believed to be potentially more cost effective than the approach of FIG. 3 because, although the approach of FIG. 4 embraces the use of gateways 410_1 through 410_N similar to the approach of FIG. 3, the functionality of the gateways is much less sophisticated in the approach of FIG. 4 as compared to FIG. 3. The approach of FIG. 4 instantiates all translation software 411_1 through 411_N for communication between the UPnP network 401 and any other network 402_1 through 402_N into a single appliance (e.g., a computer such as a personal or laptop computer). Thus, whereas the UPnP:X10 command translation needed to successfully communicate a command from an appliance connected to the UPnP network 301 to an appliance connected to the X10 network 302_1 was performed on gateway 310_1 in the approach of FIG. 3, in the approach of FIG. 4, that same command translation can be performed 411_1 on the appliance 403_2 that actually sends the original command.

As a consequence the function of gateway of 410_1 is now reduced merely to a simplistic "encapsulator/decapsulator" which is a much less sophisticated function that full translation. As will be described in more detail below, the encapsulator/decapsulator merely involves the adding and/or stripping of packet headers for a particular network type format. For instance, for communication from appliance 403_2 to any appliance on the X10 network 402_1, gateway 410_1 will simply remove the UPnP headers on the received packet.

As described in more detail below, depending on implementation, the X10 headers needed to construct a complete X10 packet may be formed by the sending appliance 403_2. In this case the sending appliance 403_2 not only constructs a command written in the X10 format because of its local translation 411_1 capability but also constructs an entire X10 packet complete with X10 headers. Here, the sending appliance 403_2 appends UPnP headers to the complete X10 packet. As such, a complete X10 packet corresponds to the payload of the packet formed by appliance 403_2 and sent to the gateway 410_1.

Alternatively, the X10 headers may be formed by the gateway 410_1. In this case, the payload of the packet sent by the sending appliance 403_2 merely corresponds to an X10 command rather than a complete X10 packet. Thus, the packet sent by the sending appliance 403_2 has UPnP headers appended to a payload having an X10 command. The gateway 410_1 strips off the UPnP headers from the received packet and appends X10 headers to payload containing the X10 command. The former approach (X10 headers created by the sending appliance 403_2) is expected to result in the most cost effective solution because the gateway 410_1 just strips off UPnP headers as opposed to stripping off UPnP headers and adding X10 headers. Better said, in the former case the gateway 410_1 does not need to comprehend any transport or routing protocol semantics/formats of the X10 network, while, in the later case it does.

The approach of FIG. 4 is believed to be very suitable to the typical situation involving multiple appliance networks in the home or office where efficiencies exist by having a master "control hub" that controls many (if not most or even all) appliances across all networks. For instance, an automated "shut-down" procedure to be executed every evening may involve: 1) setting the thermostat to a lower temperature; 2) setting the burglar alarm; and, 3) turning off certain lights. The thermostat, burglar alarm and lights may be spread across the plurality of networks 402_1 through 402_N (e.g., the thermostat is on the X10 network 402_1, the burglar alarm is on the Z Wave network 402_2 and the lights are on the IEEE 802.11 network 402_N). The shut-down procedure therefore involves the control hub 403_2 sending a number of commands into the various networks 402_1 through 402_N.

Having the control hub is an efficient solution because different types of procedures are apt to be desired (e.g., a shut-down procedure, a bring-up procedure, an emergency procedure, an entry procedure, an exit procedure, etc.) and having the application software 420_1 through 420_X for each of these procedures (each one of which includes its own set of invoked appliances to whom commands are to be sent and a corresponding command for each such appliance) running on one machine (or one type of machine such as a machine having a particular type of operating system) with a substantial amount of processing power (such as a personal computer, laptop computer or notebook computer) permits at least the possibility of better integration, compatibility and/or reuse of the this application software 420_1 through 420_X.

Another efficiency is observed in FIG. 4 in that the different smart appliance application software programs 420_1 through 420_X can be written so as to invoke only a single type of network interface API 430 (in the case of FIG. 4, UPnP network interface 407_2). This should be more cost effective than a more distributed approach in which different appliances connected to different networks are responsible for overseeing different procedures. For instance, if appliance 404_2 was responsible for running the shut-down procedure, appliance 405_3 was responsible for running the bring-up procedure and appliance 406_3 was responsible for running the emergency procedure, the shut-down application software would need to be written for an X10 network interface API, the bring-up procedure application software would need to be written for a Z Wave network interface API and the emergency procedure application software would need to be written for an 802.11 network interface. Thus, having a centralized control hub architecture should result in less expensive application software implementations.

Note that having a centralized control hub approach may also, as a general trend, result in commands being largely sent in one direction and responses to commands (which usually entail a simple statement that the command was or was not successfully executed) being largely sent in the opposite direction. For instance, in the case of FIG. 4 where appliance 403_2 is the control hub, commands will largely be sent from the control hub 403_2 and often thereafter from the UPnP network 401 into the other networks 402_1 through 402_N. Likewise, responses to commands will largely be sent to the control hub 403_2 and often from the other networks 402_1 through 402_N into the UPnP network 401.

Figure 5:
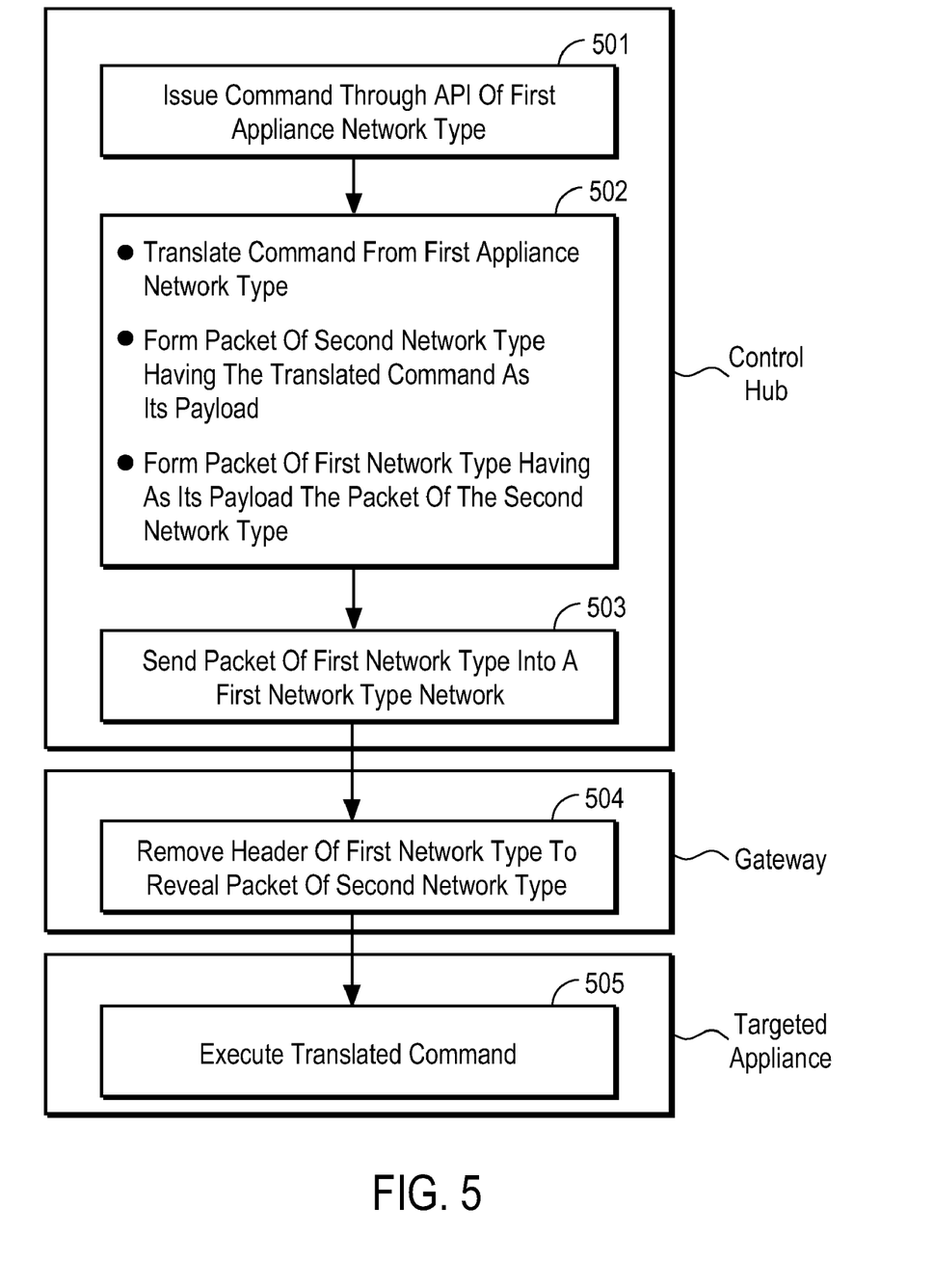
FIG. 5 shows a first methodology for communicating a command from a first appliance connected to a first appliance network to a second appliance connected to a second appliance network.
Figure 6:
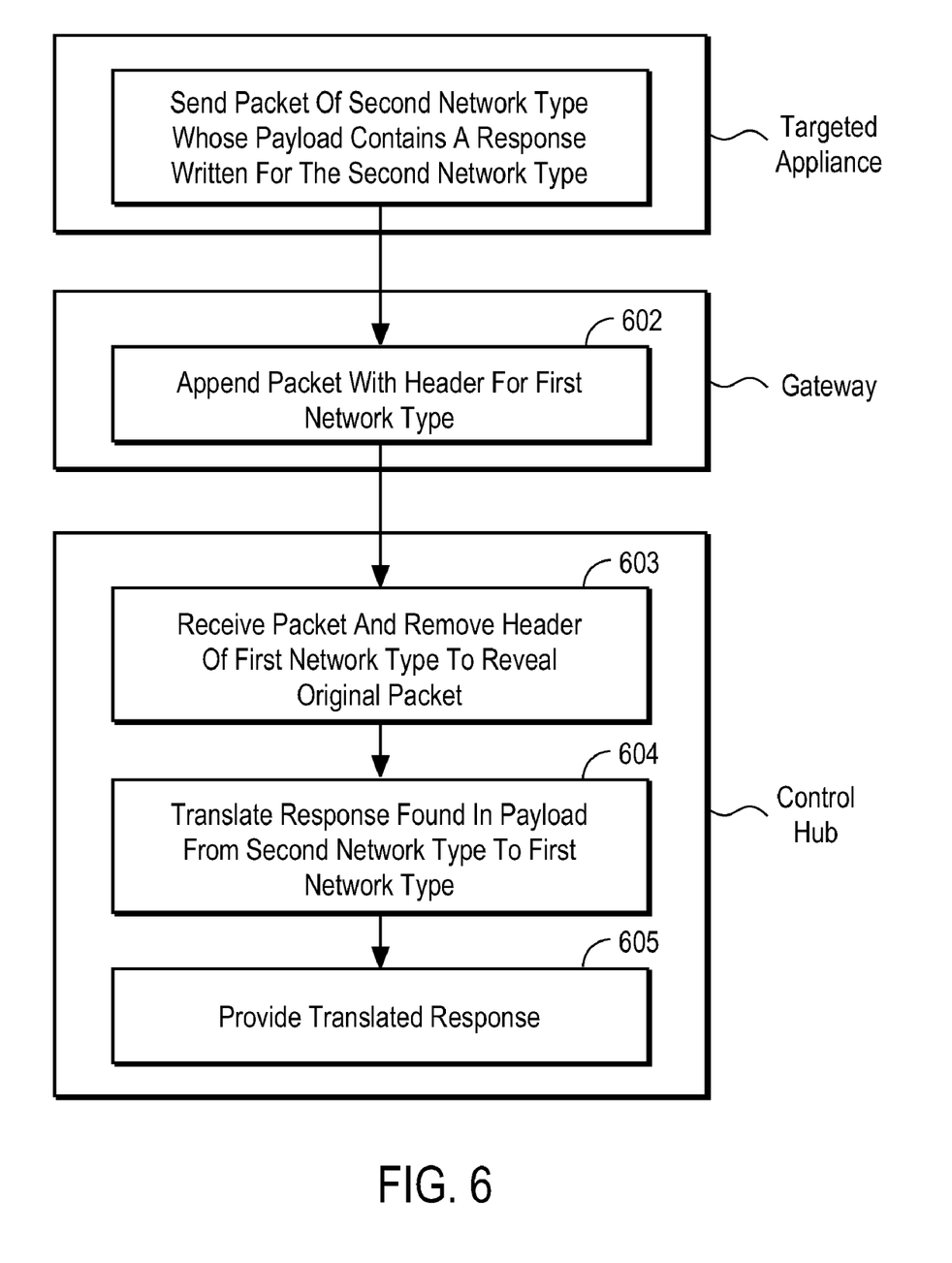
FIG. 6 shows a second methodology for communicating a command from a first appliance connected to a first appliance network to a second appliance connected to a second appliance network.

FIG. 5 describes a methodology that corresponds to the sending of a command packet from a first appliance (such as control hub 403_2) that is connected to a first network (such as the UPnP network 401) to a second appliance (such as appliance 404_2) that is connected to a second network (such as the X10 network 402_1). FIG. 6, by contrast, describes a methodology that corresponds to the sending of a response packet from a second appliance (such as appliance 404_2) that is connected to a second network (such as the X10 network 402_1) to a first appliance (such as control hub 403_2) that is connected to a first network (such as the UPnP network 401).

According to the methodology of FIG. 5, using an example where appliance 403_2 corresponds to the control hub and appliance 404_2 corresponds to an appliance that is targeted to receive a command from the control hub 403_2, initially, the application software running on the control hub 403_2 issues 501 a command through the API 430 of a network interface 407_2 for a first appliance network type (UPnP network 401). The network interface 407_2 of the control hub, in response to the command performs 502 the following: 1) translates 411_1 the command from the first appliance network type (UPnP) to the second network type (X10) that the targeted appliance 404_2 is connected to; 2) forms a complete packet of the second network type (X10) having both header information of the second network type (X10) and the translated command; 3) forms a packet of the first network type (UPnP) having header information of the first network type (UPnP) appended to a payload the is packet formed in 2) above.

The packet formed in 3) above is then sent 503 into the network of the first type (UPnP network 401). The packet is received by the gateway 410_1 for the second network 402_1 to which the targeted appliance 404_2 is connected. The encapsulator/decapsulator 413_1 of the gateway 410_1 simply strips off 504 the UPnP header information from the received packet and sends the payload (which is a complete X10 packet) into the X10 network 402_1. The targeted appliance 404_2 receives the packet from the X10 network 402_1 and executes the received command 505.

Recalling from above that there exist two basic approaches, one in which the encapsulator/decapsulator comprehends the networking and transmission protocols/semantics of the targeted (X10) network and another it which it does not, note that the methodology described above corresponds to the later. If FIG. 5 were redrawn to depict the former, process 502 would ultimately form a packet having header information of the first network type (UPnP) and a payload that is only a command written in the second network type format (X10) rather than both a command and header information in the second network type. Moreover, the encapsulator/decapsulator 413_1 process would not only strip off the first network type (UPnP) header information but also append second network type (X10) header information to the payload found in the received packet.

The methodology of FIG. 6 describes a process for responding to a command. According to the methodology of FIG. 6, continuing with the example above where appliance 403_2 is the control hub and appliance 404_2 is the targeted appliance that is responding to a command sent by the control hub 403_2, the targeted appliance 404_2 forms and sends a packet into the second network (X10) whose header information and payload are formatted according to the X10 format. Note that the payload contains the response which typically indicates whether or not the command was accepted and/or executed successfully. The gateway 410_1 receives the packet and merely appends 602 header information of the first network type (UPnP) to the received packet and resends it into the UPnP network.

The control hub 403_2 receives the packet and removes 603 the UPnP header information to reveal the complete X10 packet originally sent by appliance 404_2. The UPnP:X10 translator 411_1 of the control hub network interface 407_2 then translates 604 the X10 command into a UPnP command. The application software running on the control hub that sent the initial command then receives 605 the translated response through the UPnP API.

Again, recalling from above that there exist two basic approaches, one in which the encapsulator/decapsulator comprehends the networking and transmission protocols/semantics of the targeted (X10) network and another it which it does not, note that the methodology described above for FIG. 6 corresponds to the later. If FIG. 6 were redrawn to depict the former, gateway encapsulator/decapsulator process 602 could ultimately form a packet having header information of the first network type (UPnP) and a payload that is only a response written in the second network type format (X10) rather than both a response and header information in the second network type. As such, process 603 of the control hub's network interface need only involve the removal of the UPnP header information to reveal the X10 response.

Figure 7:
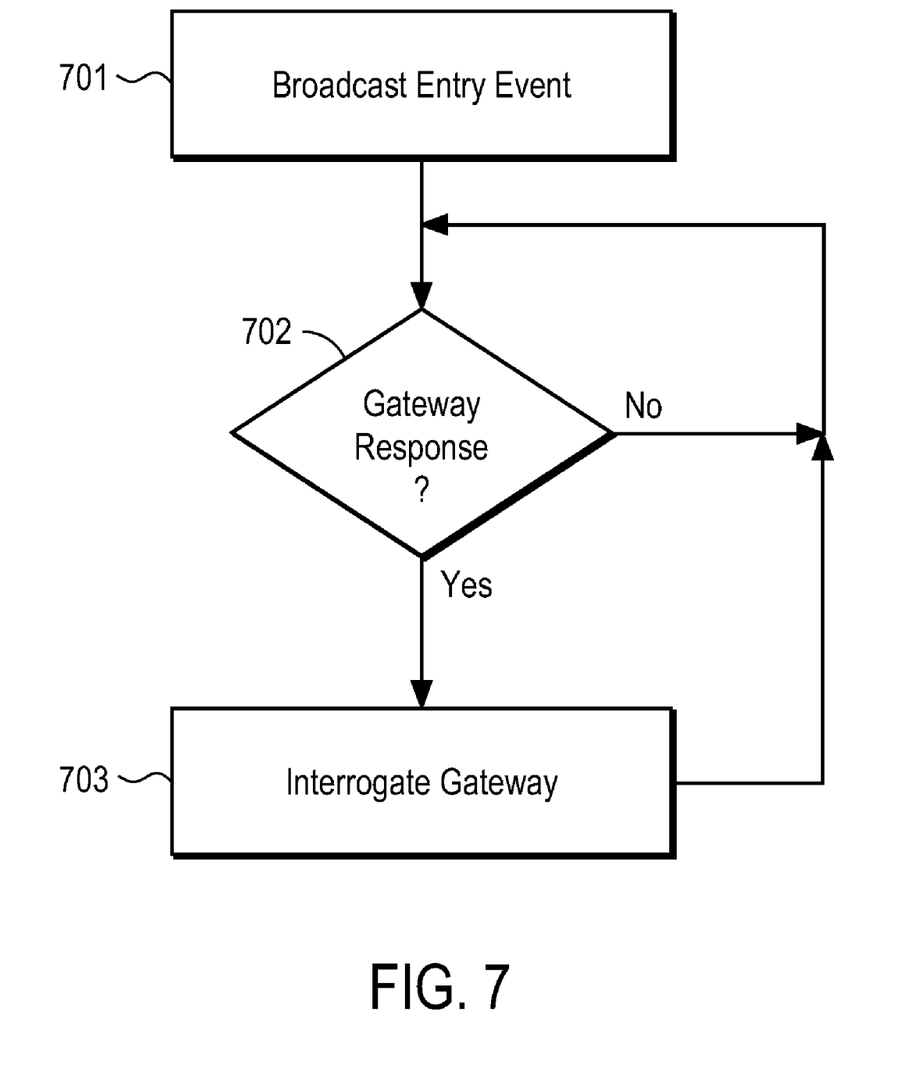
FIG. 7 shows a methodology related to the introduction of a new control hub.
Figure 8:
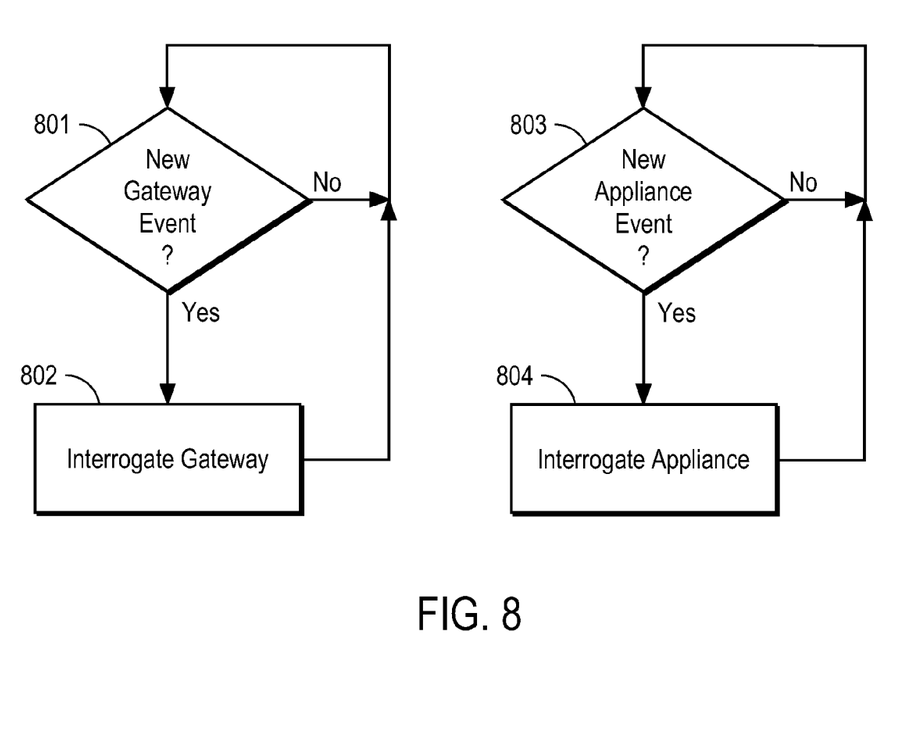
FIG. 8 shows methodologies related to the introduction of a new gateway and the introduction of a new appliance.

FIGS. 7 and 8 are "discovery" processes associated with the introduction of new appliances to a working inter-networked environment. Specifically, the methodology of FIG. 7 pertains to the introduction of a new control hub (e.g., a second control hub to UPnP network 401 of FIG. 4 other than control hub 403_2). According to the methodology of FIG. 7, and also referring to FIG. 4 as an example, when a new control hub 403_1 is entered to the UPnP network 401, the new control hub 403_1 broadcasts 701 its entry to the network 401. Each of the gateways 410_1 through 410_N should receive the broadcast and respond 702 to the broadcast. Thus, the new control hub 403_1 should receive N broadcast requests.

For each broadcast response that is received by the new control hub 403_1, the new control hub 403_1 will interrogate 703 the gateway that sent the response for information pertaining to the gateway and its corresponding appliance network. For example, gateway 410_1 will be interrogated by the new control hub 403_1 so that the new control hub 403_1 can learn more about network 402_1 (e.g., what type of network it is—in this case, an X10 network) and the appliances connected to it (e.g., the network addresses of appliances 404_2, 404_3 and their corresponding appliance type ("light", "TV", etc.), respectively). By interrogating each gateway in this manner (and by interrogating other devices on UPnP network 401 that respond to a same/similar broadcast) the new control hub 403_1 can fully educate itself of the inter-networked community it is coupled to and to support its instance of the UPnP API (e.g., so proper constructs for specific types of appliances can be instantiated). Alternative to an interrogation 703, each gateway can simply report such information to the new control hub as part of its response to the new control hub's broadcast.

FIG. 8 shows other discovery processes pertaining to the introduction of a new gateway 801, 802 and new appliance 803, 804, respectively. Both of the processes are taken from the perspective of an active, working control hub. Thus, again using FIG. 4 as an example and viewing control hub 403_2 as the working control hub, if a new gateway (e.g., and corresponding network) is added to network 401, the new gateway issues a broadcast into network 401 to announce its entry to the network. The control hub 403_2 will receive the broadcast which will trigger a new gateway event 801 within the control hub 403_2. In response to the event 801, the control hub 403_2 will interrogate the new gateway (e.g., for the same information described above with respect to the interrogation 703 of FIG. 7) and develop an understanding of the new network behind the newly added gateway.

A similar process applies when a new appliance is attached to an appliance network behind an already known gateway. A new appliance broadcasts its entry to its network. For example, if a new appliance is added to X10 network 402_1, the broadcast is issued into network 402_1. In response, the gateway 410_1 to the network 402_1 forwards the broadcast to the control hub 403_2 according to previously described processes (e.g., processes associated with FIG. 6). In response, the control hub interrogates the appliance according to previously described processes (e.g., processes associated with FIG. 5). Note the information associated with the "interrogation", whether for a new gateway event or a new appliance event, could also be supplied as part of a broadcast as well.

It is important to emphasize that although the above example uses a UPnP network as the network to which the control hub is attached, conceivably, any appliance network could be used as the network to which the control hub is connected. Moreover, the functions of the above described network interfaces (e.g., translation, packet formation, packet header information removal, etc.) as well as the encapsulator/decapsulator function could be performed in hardware (e.g., with logic circuitry and/or memory implemented on one or more semiconductor chips), software (e.g., program code executing on a processor, processing core, microcontroller, etc.) or some combination of both.

Figure 9:
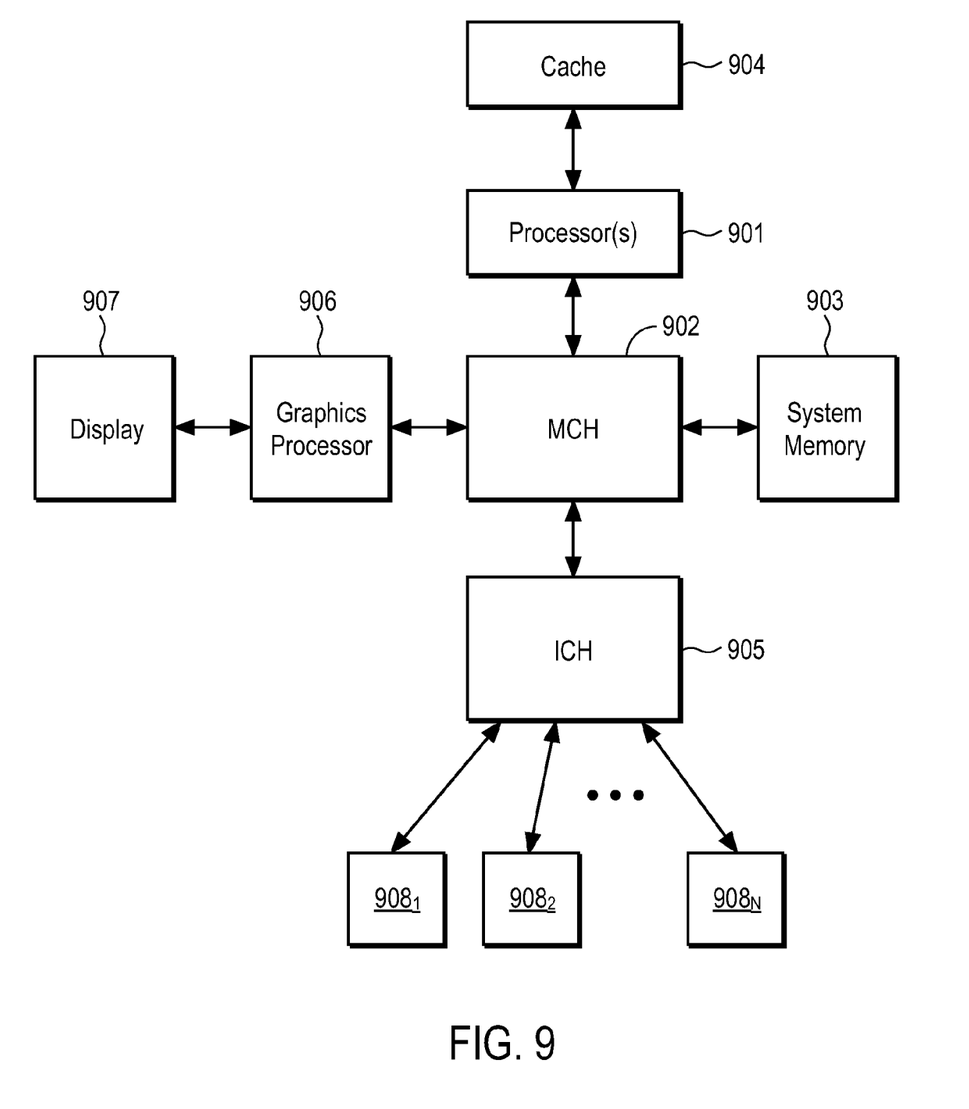
FIG. 9 shows an embodiment of a computing system.

FIG. 9 shows a computing system ("a computer"). The computing system of FIG. 9 is more typical of higher end appliances such as personal computers or laptops. More simplistic appliances (e.g., remote controls, televisions, telephones, security systems, lights and/or lighting systems, music and/or video players, recorders, and/or receivers, thermostats, smoke detectors, garage door openers, meters, etc.) tend to be more simplistic (e.g., no memory controller, no graphics processor, only a single processor/processing core, etc.).

As mentioned above, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.) or may be compiled directly into object code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

FIG. 9 shows an embodiment of a computing system (e.g., a computer). The computing system of FIG. 9 is more typical of higher end appliances such as personal computers or laptops. The computing systems found in more simplistic appliances (e.g., remote controls, televisions, telephones, security systems, lights and/or lighting systems, music and/or video players, recorders, and/or receivers, thermostats, smoke detectors, garage door openers, meters, etc.) tend to be more simplistic (e.g., no memory controller, no graphics processor, only a single processor/processing core, no cache, etc.).

The exemplary computing system of FIG. 9 includes: 1) one or more processors 901; 2) a memory control hub (MCH) 902; 3) a system memory 903 (of which different types exist such as DDR RAM, EDO RAM, etc,); 4) a cache 904; 5) an I/O control hub (ICH) 905; 6) a graphics processor 906; 7) a display/screen 907 (of which different types exist such as Cathode Ray Tube (CRT), Thin Film Transistor (TFT), Liquid Crystal Display (LCD), DPL, etc.; 8) one or more I/O devices 908.

The one or more processors 901 execute instructions in order to perform whatever software routines the computing system implements. The instructions frequently involve some sort of operation performed upon data. Both data and instructions are stored in system memory 903 and cache 904. Cache 904 is typically designed to have shorter latency times than system memory 903. For example, cache 904 might be integrated onto the same silicon chip(s) as the processor(s) and/or constructed with faster SRAM cells whilst system memory 903 might be constructed with slower DRAM cells. By tending to store more frequently used instructions and data in the cache 904 as opposed to the system memory 903, the overall performance efficiency of the computing system improves.

System memory 903 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 903 prior to their being operated upon by the one or more processor(s) 901 in the implementation of a software program. Similarly, data that a software program determines should be sent from the computing system to an outside entity through one of the computing system interfaces, or stored into an internal storage element, is often temporarily queued in system memory 903 prior to its being transmitted or stored.

The ICH 905 is responsible for ensuring that such data is properly passed between the system memory 903 and its appropriate corresponding computing system interface (and internal storage device if the computing system is so designed). The MCH 902 is responsible for managing the various contending requests for system memory 903 access amongst the processor(s) 901, interfaces and internal storage elements that may proximately arise in time with respect to one another.

One or more I/O devices 908 are also implemented in a typical computing system. I/O devices generally are responsible for transferring data to and/or from the computing system (e.g., a networking adapter); or, for large scale non-volatile storage within the computing system (e.g., hard disk drive). ICH 905 has bi-directional point-to-point links between itself and the observed I/O devices 908.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method, comprising:
   performing the following with a network interface to a first appliance network on an appliance, and not a gateway, that is communicatively coupled to said first appliance network, said appliance being an endpoint coupled to said first appliance network, said appliance being any of:
   a remote control;
   a television;
   a security system;
   a lighting system;
   a thermostat;
   a smoke detector;
   a garage door opener;
   a meter;
   receiving a first command through an application programming interface (API) for said first appliance network, said command identifying a remote appliance and an action to be taken by said remote appliance;
   translating said first command into a second command that identifies said remote appliance and said action to be taken by said remote appliance, said second command in a format for a second appliance network that is a different type of appliance network than said first appliance network; and,
   constructing a packet having header information formatted for said first appliance network and a payload containing said second command in a format for said second appliance network; and
   causing said packet having said header information formatted for said first appliance network and said payload containing said second command in a format for said second appliance network to be transmitted into said first appliance network.

2. The method of claim 1 wherein said payload also includes header information formatted for said second appliance network.

3. The method of claim 1 wherein said first appliance network is a Universal Plug n Play(UPnP) appliance network.

4. The method of claim 1 wherein said method further comprises performing the following with said network interface:
   receiving a second packet from said first appliance network;
   removing header information of said second packet;
   translating a first response to said command that is found in said second packet's payload and formatted for said second appliance network type into a second response that is formatted for said first appliance network type;
   providing said second response though said API.

5. The method of claim 4 wherein said payload also includes header information formatted for said second appliance network.

6. The method of claim 4 wherein said first appliance network is a UPnP network.

7. The method of claim 1 wherein said method further comprises performing the following with said network interface:
   a) receiving information describing a first gateway's corresponding appliance network in response to:
      said network interface causing a broadcast to be issued into said first appliance network as a consequence of said network interface being a newly added interface to said first appliance network;
   b) receiving information describing a second gateway's corresponding appliance network in response to said second gateway's corresponding appliance network being newly communicable to said first appliance network;
   c) receiving information from said second gateway describing an appliance that has been newly added to said second gateway's corresponding appliance network.

8. An article of manufacture including program code and not transitory electromagnetic signals stored on a computer readable storage medium which, when processed by a semiconductor chip processor, causes the semiconductor chip processor to perform a method, the method comprising:
   performing the following with a network interface to a first appliance network on an appliance, and not a gateway, that is communicatively coupled to said first appliance network, said appliance being an endpoint coupled to said first appliance network, said appliance being any of:
   a remote control;
   a television;
   a security system;
   a lighting system;
   a thermostat;
   a smoke detector;
   a garage door opener;
   a meter;

receiving a first command through an API for said first appliance network, said command identifying a remote appliance and an action to be taken by said remote appliance;

translating said first command into a second command that identifies said remote appliance and said action to be taken by said remote appliance, said second command in a format for a second appliance network that is a different type of appliance network than said first appliance network; and, constructing a packet having header information formatted for said first appliance network and a payload containing said second command in a format for said second appliance network; and causing said packet having said header information formatted for said first appliance network and said payload containing said second command in a format for said second appliance network to be transmitted into said first appliance network.

9. The article of manufacture of claim 8 wherein said payload also includes header information formatted for said second appliance network.

10. The article of manufacture of claim 8 wherein said first appliance network is a UPnP appliance network.

11. The article of manufacture of claim 8 wherein said method further comprises performing the following with said network interface:

receiving a second packet from said first appliance network;

removing header information of said second packet;

translating a first response to said command that is found in said second packet's payload and formatted for said second appliance network type into a second response that is formatted for said first appliance network type;

providing said second response though said API.

12. The article of manufacture of claim 11 wherein said payload also includes header information formatted for said second appliance network.

13. The article of manufacture of claim 11 wherein said first appliance network is a UPnP network.

14. The article of manufacture of claim 8 wherein said method further comprises performing the following with said network interface:

a) receiving information describing a first gateway's corresponding appliance network in response to:

said network interface causing a broadcast to be issued into said first appliance network as a consequence of said network interface being a newly added interface to said first appliance network;

b) receiving information describing a second gateway's corresponding appliance network in response to said second gateway's corresponding appliance network being newly communicable to said first appliance network;

c) receiving information from said second gateway describing an appliance that has been newly added to said second gateway's corresponding appliance network.

15. A method, comprising:

performing the following between first and second different appliance networks:

receiving a packet from said first appliance network, said packet originally created entirely by an appliance that launched said packet into said first appliance network, said appliance being an endpoint coupled to said first appliance network, said appliance being any of:

a remote control;
a television;
a security system;
a lighting system;
a thermostat;
a smoke detector;
a garage door opener;
a meter;

removing header information for said first appliance network from said packet; and, sending said packet's payload into said second appliance network without having appended any header information for said second appliance network to said payload, said payload containing header information for said second appliance network.

16. The method of claim 15 wherein said first appliance network is a UPnP network and said second network is one of:

an X10 network;
a Z Wave network;
an IEEE 802.11 network.

17. The method of claim 15 wherein said first appliance network is an X10 network and said second network is one of:

an UPnP network;
a Z Wave network;
an IEEE 802.11 network.

18. The method of claim 17 wherein said first appliance network is a Z Wave network and said second network is one of:

a UPnP network;
an X10 network;
an IEEE 802.11 network.

19. The method of claim 15 wherein said first appliance network is an IEEE 802.11 network and said second network is one of:

a UPnP network;
an X10 network;
a Z wave network.

20. The method of claim 15 wherein said method further comprises, after said sending, executing a command contained in said payload at a network appliance that is connected to said second appliance network.

21. A semiconductor chip, comprising:

logic circuitry to perform the following on an appliance, and not a gateway, that is communicatively coupled to a first appliance network, said appliance being an endpoint coupled to said first appliance network, said appliance being any of:

a remote control;
a television;
a security system;
a lighting system;
a thermostat;
a smoke detector;
a garage door opener;
a meter:

receive a first command, said command identifying a remote appliance and an action to be taken by said remote appliance in said first appliance network;

translate said first command into a second command that identifies said appliance and said action to be taken by said appliance, said second command in a format for a second appliance network that is a different type of appliance network than said first appliance network;

construct a packet having header information formatted for said first appliance network and a payload containing said second command; and, cause said packet having said header information formatted for said first appliance network and said payload containing said second command in a format for said second appliance network to be transmitted into said first appliance network.

22. The semiconductor chip of claim 21 wherein said payload also includes header information formatted for said second appliance network.

23. The semiconductor chip of claim 21 wherein said first appliance network is a UPnP appliance network.

24. The semiconductor chip of claim 21 wherein said logic circuitry is also to:
receive a second packet from said first appliance network;
remove header information of said second packet; and,
translate a first response to said command that is found in said second packet's payload and formatted for said second appliance network type into a second response that is formatted for said first appliance network type.

25. The semiconductor chip of claim 24 wherein said payload also includes header information formatted for said second appliance network.

26. The semiconductor chip of claim 24 wherein said first appliance network is a UPnP network.

* * * * *